No. 855,776. PATENTED JUNE 4, 1907.
A. C. HEATH.
AUTOMOBILE AND OTHER VEHICLE.
APPLICATION FILED SEPT. 8, 1906.
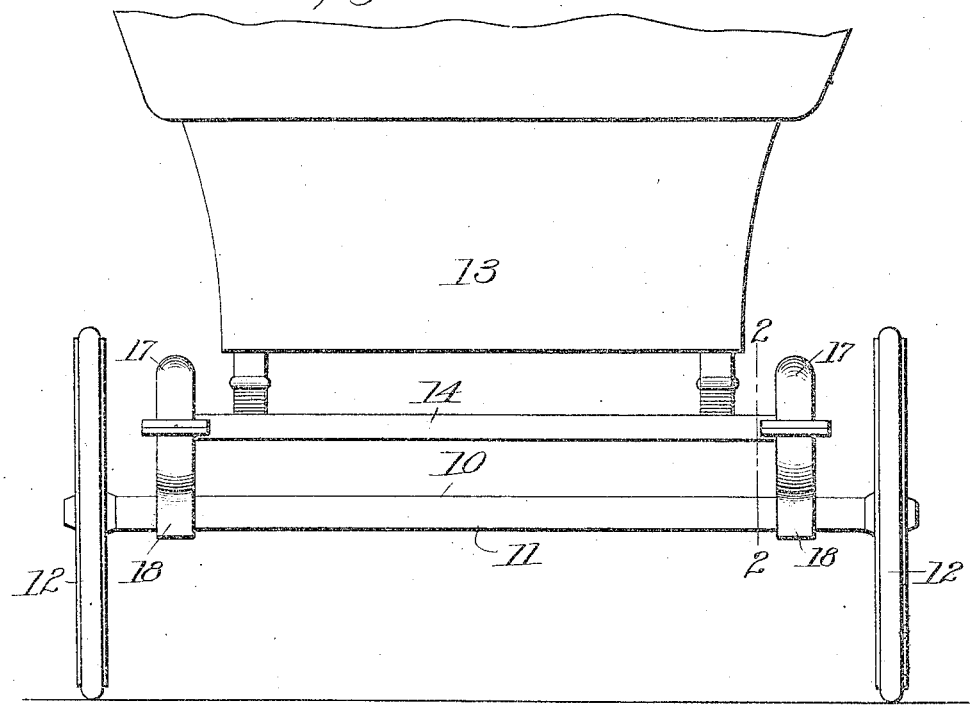
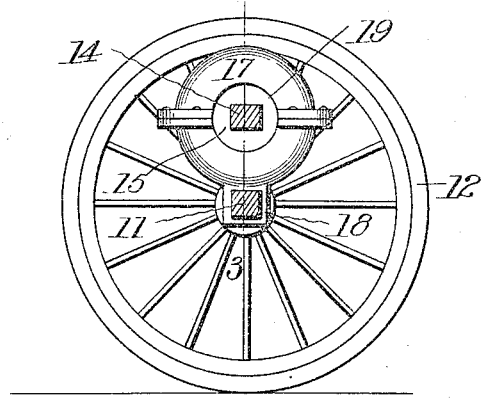
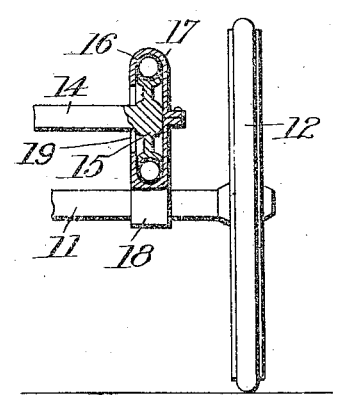
Witnesses
C. N. Walker
Wm. D. Hodges
Inventor
Albert C. Heath
By Henry P. Blair
Attorney

UNITED STATES PATENT OFFICE.

ALBERT C. HEATH, OF ST. PAUL, MINNESOTA.

AUTOMOBILE AND OTHER VEHICLE.

No. 855,776.　　　　Specification of Letters Patent.　　　　Patented June 4, 1907.

Application filed September 8, 1906. Serial No. 333,837.

*To all whom it may concern:*

Be it known that I, ALBERT C. HEATH, a citizen of the United States, residing at St. Paul, in the county of Ramsey and State of Minnesota, have invented certain new and useful Improvements in Automobiles and other Vehicles, of which the following is a specification.

This invention relates to certain new and useful improvements in automobiles, and has reference more particularly to the production of simple and improved means for relieving the body of the vehicle of jolts and jars while in motion.
The invention has for its object the production of a running gear which will resiliently support the body of the vehicle in such manner that the usual pneumatic tire may be dispensed with and the annoyances due to puncture, etc. completely obviated.

A further object is to provide a pneumatic spring or support for the vehicle body so arranged that no matter in what direction an impulse may come the same will be softened and the consequent jolts and jars relieved.

A further object is to provide simple and improved means for securing the pneumatic cushion or spring in position.

In carrying out my invention the vehicle body is supported upon arms or axles each of which is provided at its ends with circular disks surrounded by pneumatic cushions, similar in every respect to the ordinary pneumatic tire. These cushions are embraced by keepers secured to the axles of the vehicle, said keepers being so constructed as to prevent displacement of the cushions and yet permit the latter to yield with the movements of the vehicle body.
The invention will be hereinafter fully set forth and particularly pointed out in the claims.

In the accompanying drawing:—Figure 1 is an end view of an automobile illustrating my invention. Fig. 2 is a sectional view on line 2—2, Fig. 1. Fig. 3 is a detail sectional view on line 3—3, Fig. 2.

Referring to the drawing, 10 designates the usual running gear provided with axles 11 upon which are mounted the carrying wheels 12 which may be of any preferred construction. The body 13 of the vehicle is provided at each end with transverse arms or supplemental axles 14 provided at their free ends with disks 15 which may be of any preferred form. The periphery of each disk is enlarged to form a seat to which is secured a pneumatic cushion 16, the same being preferably a pneumatic tire of any suitable or preferred construction. The disks and their supporting arms are held from displacement by means of a keeper or holder 17 formed of two members, the lower member being provided with a bracket 18 embracing the axle 11, the upper member being bolted to the lower member by means of bolts passing through contiguous flanges of the two sections. Said keepers are cut out at 19 to allow free play of the arms 14 and disks 15 in a vertical direction, the outer faces of each keeper being closed. The flanges of the two sections of each keeper 17 are arranged opposite each end of the arms 14, thereby greatly strengthening the outer wall of said keeper to resist the end thrust of said arms.

The advantages and operation of my improved running gear will be readily apparent. It will be particularly noted that the vehicle body is supported in such manner as to secure all the advantages and benefits of a vehicle equipped with pneumatic tires, and yet all possibility of puncture is obviated. It will also be noted that the body of the vehicle is supported in such a manner that no matter in what direction an impulse may come the same is softened by the pneumatic cushions. It will be further observed that the parts are securely held from displacement, and yet are easy of access and removal for repairs, etc., the keeper being so constructed as to be readily removed or replaced.

It will also be understood that while I have illustrated and described the disks and pneumatic cushions as being circular in form, I do not limit myself in this particular, as the shape may be altered without departing from the spirit of my invention.

I claim as my invention:—

1. An improvement in automobiles comprising a vehicle body, arms secured thereto, a pneumatic cushion secured to each of the free ends of said arms, a keeper independent of the arms and embracing each cushion, said keepers being each provided with an outer closed side, and a bracket formed with the lower portion of each keeper and adapted to be rigidly secured to the axle of the vehicle.

2. An improvement in automobiles comprising a vehicle body, arms secured thereto, a pneumatic cushion secured to each of the free ends of said arms, keepers independent of the arms and embracing each cushion, said keepers being formed in sections and each provided with an outer closed side, a bracket carried by the lower section of each keeper and adapted to be rigidly secured to the axle of the vehicle, and means for uniting said sections.

3. An improvement in automobiles comprising a vehicle body, arms secured thereto, a disk located on each of the free ends of said arms, each disk being provided with a rim having its edge formed as a seat, a pneumatic cushion secured to said rim and filling said seat, and a keeper surrounding each cushion and closely embracing the same, said keepers having their inner walls cut out to permit play of said arms, the outer walls of said keepers being strengthened to resist the end thrust of said arms.

4. An improvement in automobiles comprising a vehicle body, arms secured thereto, a disk located on each of the free ends of said arms, each disk being provided with a rim having its edge formed as a seat, a pneumatic cushion secured to said rim and filling said seat, and keepers surrounding each cushion and closely embracing the same, said keepers being formed in sections and having their inner walls cut out to permit play of said arms, the outer walls of said keepers being closed and provided with coincident securing flanges to strengthen said outer walls against the end thrust of said arms.

5. An improvement in automobiles comprising a vehicle body, arms secured thereto, a disk located on each of the free ends of said arms, each disk being provided with a rim having its edge formed as a seat, a pneumatic cushion surrounding said rim and filling said seat, keepers formed in sections and surrounding said cushions, flanges extending diametrically across said keepers and arranged opposite the ends of said arms, and brackets carried by the lower sections of the keepers and adapted to embrace the axles of the vehicles.

In testimony whereof I have signed my name to this specification in the presence of two subscribing witnesses.

ALBERT C. HEATH.

Witnesses:
CLARA E. HOWARD,
M. B. HENDERSON.